United States Patent [19]

Jonsson

[11] Patent Number: 4,579,662
[45] Date of Patent: Apr. 1, 1986

[54] METHOD AND APPARATUS FOR FILTRATION OF A SUSPENSION OR A COLLOIDAL SOLUTION

[76] Inventor: Svante U. R. Jonsson, Protokollgränden 38, S-222 47 Lund, Sweden

[21] Appl. No.: 167,753

[22] Filed: Jul. 14, 1980

Related U.S. Application Data

[63] Continuation of Ser. No. 895,965, Apr. 13, 1978, abandoned, which is a continuation of Ser. No. 703,266, Jul. 7, 1976, abandoned.

[30] Foreign Application Priority Data

Jul. 7, 1975 [SE] Sweden .............................. 75077412

[51] Int. Cl.$^4$ ............................................. B01D 13/00
[52] U.S. Cl. ..................................... 210/636; 210/637
[58] Field of Search ............... 210/636, 637, 411, 409; 435/814, 803

[56] References Cited

U.S. PATENT DOCUMENTS

| 3,436,260 | 4/1969 | Duff | 127/55 |
| 3,853,756 | 12/1974 | Stana | 210/412 X |
| 3,974,068 | 8/1976 | Ebner et al. | 210/433.2 X |

Primary Examiner—Frank Spear
Attorney, Agent, or Firm—Finnegan, Henderson, Farabow, Garrett & Dunner

[57] ABSTRACT

In a method for filtering a suspension or colloidal solution the filtering takes place periodically and rinsing fluid is supplied in short intermissions between the filtering periods.

15 Claims, 14 Drawing Figures

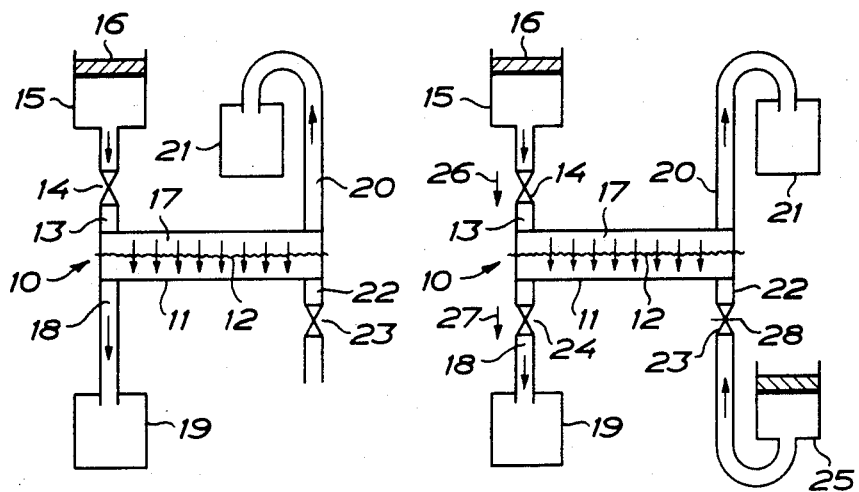
FIG. 1 PRIOR ART
FIG. 2
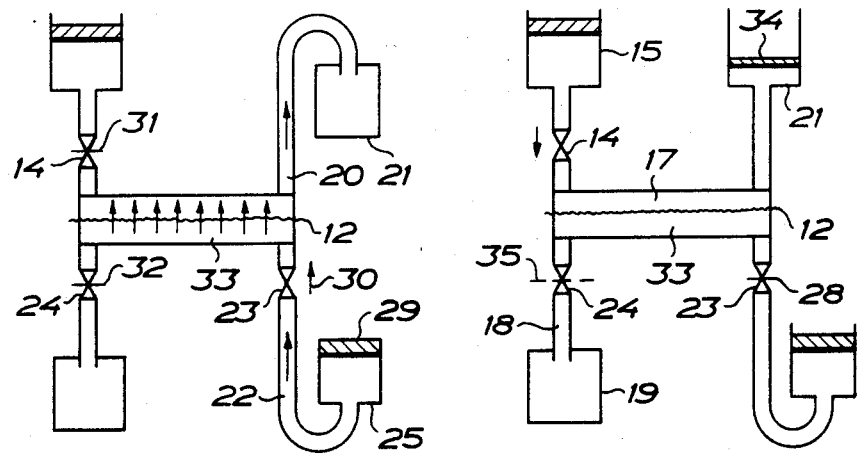
FIG. 3
FIG. 4

METHOD AND APPARATUS FOR FILTRATION OF A SUSPENSION OR A COLLOIDAL SOLUTION

This is a continuation of application Ser. No. 895,965, filed Apr. 13, 1978 as a continuation of Ser. No. 703,266 filed 7/7/76, both now abandoned.

BACKGROUND OF THE INVENTION

1. Field of the Invention

The present invention relates to a continuous process for filtration of a suspension or a colloidal solution through a filtering device.

The invention also relates to an apparatus for working this process and to control means for said filtering device.

2. Description of the Prior Art

The production of vaccines and other solid or soluble products from microbes or animal cells requires the purification of large amounts of microbes, e.g. bacteria and virus, or animal cells, e.g. tumor cells, and/or the preparation of particle-free growth medium. Presently, for the concentration and washing of cultured particles, which are usually present in a broad concentration range around 1 volume percent, centrifuges are used virtually exclusively. This is true also for the preparation of soluble substances from growth media with a high particle density (solid content). Standard centrifuges with angle rotors or swing-out rotors have obvious drawbacks when processing large volumes because they have to be stopped repeatedly so that the supernate can be manually emptied and it can be filled up again with more suspension. Besides, the recovered particles must be resuspended and washed which is cumbersome since the material is distributed into a number of vessels. Certain centrifuges of specific construction allow continuous filling and discharge of supernate during rotation whereby the particle mass separated in the centrifuge rotor is either recovered as a sediment in the rotor or leaves the rotor continuously as a concentrate (according to the separator principle). Aside from their high price and complicated management, these special centrifuges have the important disadvantage in common with conventional centrifuges that the risks of disseminating dangerous microbes, e.g. through splashing or aerosol formation, are difficult or impossible to eliminate.

Finally one can point to the corresponding difficulties involved in keeping bacteria being washed with centrifuge techniques free from contaminating microbes. This may potentially be of great importance when producing concentrated suspensions of bacteria of so-called starter cultures for the dairy industy. Furthermore, centrifuges do not produce a fluid phase, sufficiently free from solid phase as required for a number of applications.

The last few years' development in filtering technology has resulted, among other things, in the construction of devices with large filtering areas for the concentration and/or dialysis of soluble substances and also for the sterile filtration of solutions of heat labile substances with a minimal content of microbes. The possibility of using conventional filtering devices in order to concentrate and wash, e.g. bacteria cultured in a fluid growth medium is limited by the fact that the filter membranes rapidly will be obstructed or clogged by a film of bacteria. However, it has been demonstrated—in the case of particle separation as well as in the case of so-called ultrafiltration (molecular sieving)—that devices constructed for tangential flow of the fluid under treatment across one surface of the filter membrane, here called the primary surface, allow that before obstruction a (much) larger volume of filtrate can be recovered on the other surface, here called the secondary surface, than in conventional constructions. When using special devices for ultrafiltration comprising bundles of parallel thin tubes, through which the solution or suspension being treated passes according to said principle of tangential flow, one has exploited the possibility, after the use of the filtration device, to regenerate, that is to wash the primary surface free from obstructing colloidal material by arranging a flow of rinsing fluid, which runs through the filter membranes in a direction opposite to that of the filtrate, i.e. from the secondary to the primary surface. A significant drawback of such equipment—exempting the fact that membrane tubes suitable for the filtration of so-called true particle suspensions are not available—is that the "dead volume" is large particularly at the secondary surface of the outside of the thin tubes. This means that, if it is necessary, during filtration, to make an interruption in order to regenerate the filtering device in the manner just mentioned, this will result in a larger quantity filtrate penetrating from the primary surface at the beginning of each rinsing period and leaving the filter together with the solid or colloidal phase from which the liquid phase should be separated. Moreover, the filtrate will be diluted with a considerable amount of rinsing liquid at the beginning of a following filtering period. The same drawbacks prevail in case it is preferred to have the liquid to be filtered outside the parallel thin tubes.

SUMMARY OF THE INVENTION

A primary object of the present invention is to eliminate said drawbacks.

It is a further object of the invention to provide method and apparatus facilitating an automation of the harvesting of growth media containing microbes or animal cells.

A still further object is to eliminate or substantially minimize the risks of disseminating dangerous microbes as well as the risks of contaminating the material being processed.

Another object is to provide method and apparatus allowing material to be automatically and economically processed in smaller quantities than are suitable for continuously operated separators.

Yet another object is to provide a favourable method for the separation of bacteria-free medium from a bacteria broth culture or any bacterial suspension, e.g. containing pathogenic bacteria because this is often the prerequisite for further processing of the medium in the purification of soluble products, e.g. in vaccine production, and also because loss of solid phase might be unacceptable.

Finally, a further object of the invention is to provide a method for the washing of bacteria while keeping them in suspension, although in the presence of a chemical environment that with centrifuge technique would cause the bacteria to form a sediment that is impossible to resuspend homogeneously.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purposes, the invention provides a process wherein the suspension is delivered to a filtering device during consecutive periods through one tube, at the same time as a concentrated particle suspension is taken away through a second tube and filtrate through a third one, while a fourth tube is kept closed, intermissions being included between the consecutive periods, and wherein, during such intermissions, the first and the third tubes are kept closed and the fourth one is opened for the introduction of a washing fluid, which is recovered through the second tube.

The invention also provides an apparatus for continuously filtering a suspension or a colloidal solution comprising a filtering device having a filter membrane, a first vessel for a suspension to be processed, a valve controlled first tube connecting said first vessel with the primary side of the membrane, a second vessel for concentrated suspension, a second tube connecting said second vessel with the primary side of the membrane, a third vessel for filtrate, a valve-controlled third tube connecting said third vessel with the secondary side of the membrane, a fourth vessel for rinsing fluid, and a valve-controlled fourth tube connecting said fourth vessel with the secondary side of the membrane.

Preferably there is used for working the method according to the invention a filter membrane holder which has a minimal dead volume over the two surfaces of a filter membrane or a number of such membranes arranged in parallel, e.g. made from cellulose acetate with a mean pore size of 0.2 micron, and which holder is constructed for tangential flow of the suspension or solution to be treated across the primary surface of the filter membranes. By using a filter membrane holder is described one can attain an effective concentration of a particle suspension and, during the short intermissions, one can repeatedly regenerate the filtering device without significant return of filtrate to the primary surface or significant dilution of the filtrate with washing fluid.

The accompanying drawings, which are incorporated in and constitute a part of this specification, illustrate embodiments of the invention and, together with the description, serve to explain the principles of the invention.

BRIEF DESCRIPTION OF THE DRAWINGS

Of the drawings:

FIG. 1 shows a known filtering device with one filter membrane and four tube connections;

FIGS. 2-4 show various steps of filtration according to the invention in a device according to FIG. 1;

Figure 5:
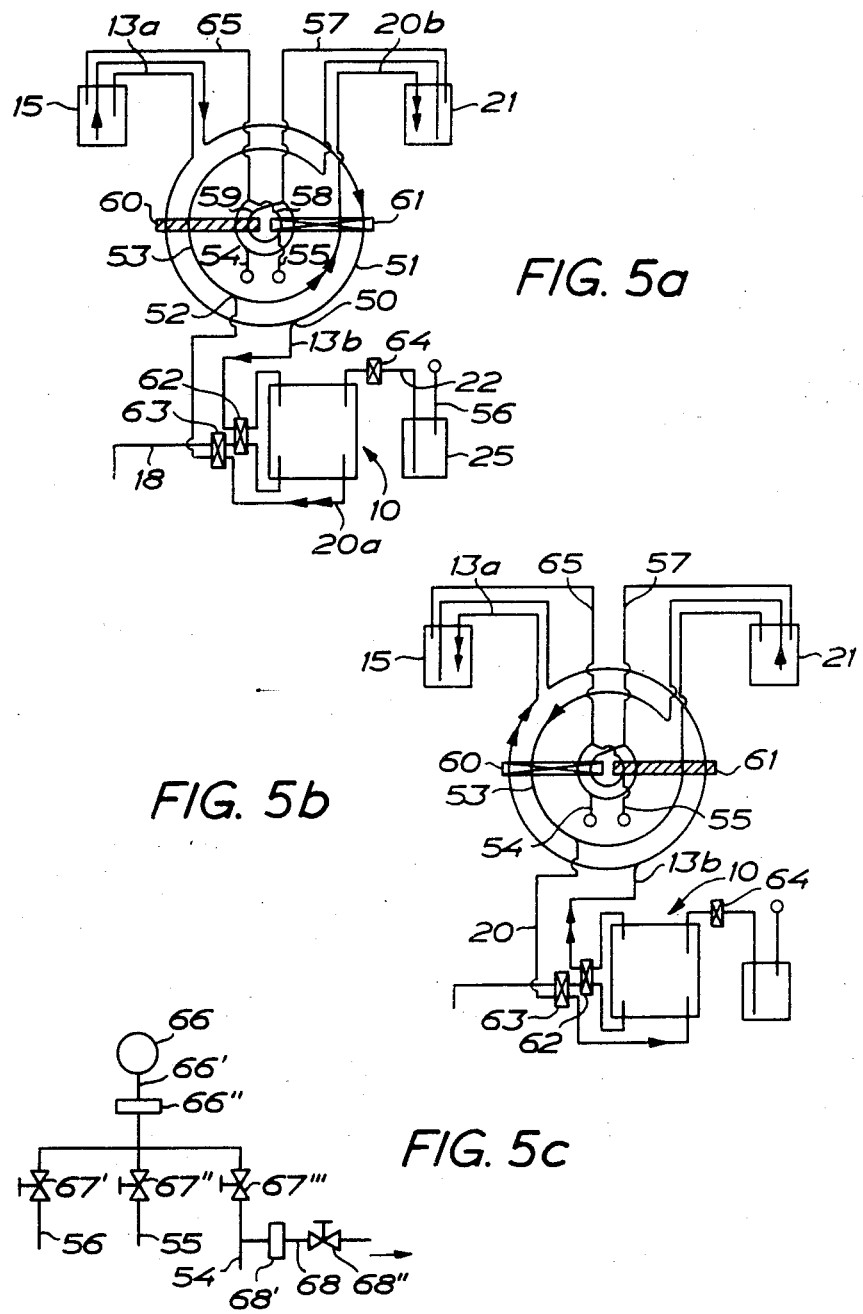
FIGS. 5a and 5b show diagrammatically equipment connected to and including the filtering device and attached tubes and vessels.
FIG. 5c discloses connections for pressurized air to the equipment of FIGS. 5a and 5b.

Reference will now be made in detail to the present preferred embodiments of the invention, examples of which are illustrated in the accompanying drawings.

DESCRIPTION OF THE PREFERRED EMBODIMENTS

As shown in FIG. 1 the known filtering device 10 comprises a filter membrane holder 11 wherein a filter membrane 12 is fixed. Through a tube 13 with a valve 14 a suspension or a colloidal solution containing small particles can be supplied from a vessel 15. The suspension in vessel 15 is put under pressure by a suitable pump, which is schematically shown as a heavy body 16 resting on the suspension. Alternatively, the driving pressure can be achieved through hydrostatic pressure or through the influence of a mechanical pump coupled to tube 13. When the suspension is supplied to the filter membrane holder 11, it passes in a tangential flow through a flow path 17 across the primary surface of the filter membrane. A large fraction of the fluid phase passes through the filter membrane 12 across to its secondary surface and leaves the filter membrane holder in the shape of a filtrate through a tube 18, which brings the filtrate to a collecting vessel 19. At the same time, a fraction of the solid phase of the suspension becomes attached to the filter membrane. From the filtering device through a tube 20 a concentrated suspension is supplied to a vessel 21. The filtering method thus described is prior art and forms no part of the invention. The filtration equipment has an additional tube 22 with a valve 23, which is kept closed during the filtration and forms no operative part in the filtration procedure described.

From FIG. 2 it will be seen that, according to the invention, the filtering device 10 has been provided with a valve 24 on tube 18 and that tube 22 through valve 23 has been connected to a vessel 25, which contains a rinsing fluid. According to the invention, the suspension is supplied to the filtering device 10 through tube 13 during consecutive periods with intervening intermissions. During such a period valves 14, 24 and 23 are kept in the positions shown in FIG. 2. Valves 14 and 24 are kept open as indicated by the arrows 26, 27, while valve 23 is kept closed as indicated by the transverse line 28. The filtration then takes place in known manner as has been described in connection with the equipment according to FIG. 1.

During this filtration a certain amount of particles adhere to the primary surface of the filter membrane in the flow path 17, and gradually the amount of particles becomes so great that the passage of filtrate diminishes considerably. If one were to continue, the whole flow path 17 would soon be obstructed. In order to avoid that the filtration process has to be stopped altogether for the cleaning or exchange of the filter membrane(s) and instead make possible a continued filtration of larger amounts of suspension, one proceeds, according to the invention, during repeated interruptions between filtration periods as shown in FIG. 3. In vessel 25 is contained a rinsing fluid, suitable for its purpose, which by a suitably connected propelling force, marked by a weight 29, is discharged into tube 22. Valve 23 is opened, as indicated by the arrow 30, while valves 14 and 24, as indicated by transverse lines 31, 32 are closed. The rinsing fluid is forced into the flow path 33 on the secondary surface of the filter membrane 12 and, valve 24 being closed, passes through the membrane, whereby particles attached to the primary surface are rinsed away and with the rinsing fluid are forced through tube 20 into vessel 21, which contains concentrated particle suspension (from the previous filtration step). In this rinsing step one observes a certain dilution of the fluid of the suspension in vessel 21, which is potentially advantageous as will be described below. On the other hand this dilution might be regarded as disadvantageous, and if so it can be avoided by a modification to be described. In order to increase the filtration capacity of the filtration equipment a counter pressure can be applied to the suspension, in a manner known per se, on its way to vessel 21 by means of a suitable device, indicated in FIG. 4 by a smaller weight 34 on the suspension in the vessel. This effect can be achieved by hydrostatic pressure, by a mechanical counter pressure valve provided in tube 20, or by the application of pressurized air on receiving vessel 21. Thus, by increasing the pressure difference over the filter membrane one can increase the yield of filtrate.

At the start of a step of filtration there is a certain risk of rapid coating of the primary surface with solid phase because of the increased counter pressure that is inherently applied to the suspension during the acceleration of the tangential flow. FIG. 4 illustrates a novel manner to avoid this rapid coating and achieve solely the intended flow of suspension through the filtering device during this particular starting step, which in other respects closely resembles the filtration step that was described in connection with the setup according to FIG. 2 with the exception that filtrate is not allowed to be discharged, i.e. there will be no passage of fluid through the membrane(s). Valve 23 has been closed after the rinsing of filter membrane 12 as indicated by the transverse line in FIG. 4. Valve 14 is opened so that suspension is supplied to the primary surface of the filter membrane and further to suspension vessel 21. However, valve 24 of tube 18 which leads to receiving vessel 19 for filtrate is not opened at the same time but only after the flow across the primary surface has been established. This is indicated by the dashed transverse line 35 across valve 24.

Summarizing filtering device 10 according to FIGS. 1 to 4 has four connections, viz. to tube 13, tube 20, tube 18 and tube 22. As is clear from the description of FIG. 4, one can work, according to the invention, with pressures on the tubes 13, 14 and 22. This has been indicated diagrammatically in the preceding figures; for practical purposes it might be advantageous to use pressurized air from a common source with reduction valves in the air tubes to the various vessels in which the fluid shall be subjected to pressure. When using the equipment for the filtration of a bacterial suspension it has been found suitable to apply a pressure of about 17 psi as the propelling pressure on vessel 15 for the bacterial suspension to be processed. As a counter pressure on the concentrated suspension in vessel 21 it is suitable to apply a pressure of about 5.7 psi. In vessel 25 for rinsing fluid, e.g. phosphate-buffered saline solution (PBS), a pressure of about 45 psi can be applied as propelling pressure. In certain cases during filtration it might be preferred to stop discharge of concentrated suspension by means of a corresponding valve or to apply a counter pressure so high that in practice no flow to the receiving vessel takes place. Then, there will be a more rapid concentration of bacteria, which, according to the invention, will be rinsed away intermittently.

The invention has been successfully applied to the separation of staphylococci from a rich growth medium, where the bacteria have grown to attain maximum density. In this case there was used a filtering device (filter membrane holder) from Sartorius Membranfilter AG, Göttingen, Federal Republic of Germany, with the designation SM 16525, which was fitted up with fifteen filter membranes made of cellulose acetate designated SM 111 07. These have a mean pore size of 0.2 micron and the total filtering area measures up to about 0.25 $m^2$. Also filter membranes having a mean pore size of 0.45 micron have been tested with a good result. By way of tube 13 bacterial suspension was supplied to the filtering device and by way of tube 20 the major part of the solid phase, as a concentrate, was brought from the filtering device to a pressurized receiving vessel 21. One of the openings of the filtering device was connected, as before, to tube 18 for filtrate to be supplied to a collecting vessel and another opening of the filtering device was connected to a pressurized vessel containing rinsing fluid. In the filtration equipment, according to the invention, the two vessels containing bacterial suspension, i.e. vessels 15 and 21, can change places or be connected so that the functions of said vessels can be exchanged. Thus, filtration can be achieved by letting the suspension flow through the filtering device across the primary surface of each filter membrane and further to the second vessel, and/or vice versa. Equipment for carrying out the former and the latter process, respectively, is disclosed in FIGS. **5*a* and 5*b***. These processes will be termed Phase I and Phase II, respectively, in the description which follows.

The two figures **5*a* and 5*b* show the same equipment; only the positions of valves and directions of flow differ. The equipment consists of a filtering device 10 with attached tubes, viz. a first tube line 13*a*, 13*b*, a second tube line 20*a*, 20*b*, a third tube 18 for filtrate and a fourth tube 22 for rinsing fluid from vessel 25. The first tube line 13*a*, 13*b* leads to vessel 15 and the second tube line 20*a*, 20*b* to vessel 21. However, from the filtering device 10 to vessel 15 there is an alternative tube line 13*b*, 51, tubes 13*a* and 51 branching from tube 13*b* at a point 50 and from filtering device 10 to vessel 21 there is correspondingly an alternative tube line 20*a*, 53, tubes 20*b* and 53 branching from tube 20*a* at a point 52. This makes possible, through the use of valves, filtration by conveying a bacterial suspension from vessel 15 through filtering device 10 to vessel 21**, or vice versa. By changing flow direction in this manner one can rapidly carry through the concentration and washing of a bacterial suspension.

In FIGS. **5*a* and 5*b* is also indicated that three different pressures are applied to vessels 15,21, 25 as mentioned before. The setup is also such that the pressure in vessels 15 and 21 can be reversed, depending on the flow direction desired through the filtering device. Thus, in the system there is a tube 54 with a lower air pressure (counter pressure) regulated by a reducing valve for supplied pressurized air, as will be described. In the system there is also a tube 55 carrying a higher air pressure (propelling pressure) and a tube 56 with a still higher air pressure conveyed to vessel 25 containing rinsing fluid. From pressure tube 54 there is a tube 65 to vessel 15 and another tube 57 to vessel 21. From pressure tube 55 carrying propelling pressure there is a tube 58 to a junction on tube 65 to vessel 15 and another tube 59 to a junction on tube 57 to vessel 21**.

The system contains a number of valves for the control of flow paths and air pressures. Valves in tubes **13*a*, 53, 65 and 59, indicated as a block 60**, are controlled by a common control device, not shown, and valves in tubes 51, 20b, 57 and 58, indicated as a block 61, are controlled by another common control device, not shown. In FIGS. 5a and 5b valve blocks 60 and 61 are diagrammatically shown with all valves therein closed as a hatched block and with all valves therein opened as a block with diagonally crossing lines.

Closer to filtering device 10 there are in FIGS. 5a and 5b a valve in suspension tube 13b and a valve in filtrate tube 18, which have a common designation 62 and are controlled by a common control device, not shown. Furthermore, there is a valve in suspension tube 20a and another valve in filtrate tube 18, in common designated 63 and controlled by a common control device, not shown. In tube 22 for rinsing fluid there is a valve 64.

During Phase I, as shown in FIG. 5a, the valves of block 60 are closed, the valves of block 61 are open and valves in each of blocks 62 and 63 are open during a first filtration step (a). The pressurized air (counter pressure) is applied from tube 54 through tube 57 to vessel 21, and pressurized air (propelling pressure) is applied from tube 58 and tube 65 to vessel 15. The bacterial suspension in vessel 15 is supplied, as indicated by single arrows, through tube line 51, 13b to the filtering device, whereupon filtrate is discharged through tube 18 as a concentrated suspension, as indicated by double arrows, through tube 20b to vessel 21.

During a second step (b) valve blocks 60 and 61 are in the same positions as during the first step (a), but the valves of block 62 are closed while the valves of block 63 still are open. Valve 64 is opened whereby rinsing fluid is forced through the filtering device 10 out through tube line 20a, 20b to vessel 21.

At the beginning of a third step (c) valve 64 in tube 22 for rinsing fluid is closed and the passage for tube 13b through block 62 is opened, while tube 18 through block 62 remains closed. Then, the pressures on vessels 15, 21 act to set the bacterial suspension in motion from vessel 15 by way of the filtering device 10 across the primary surface of each filter membrane to vessel 21. Then, the valve for tube 13b in block 62 is opened so that flow takes place in the way indicated by the arrows, corresponding to the first step (a) of Phase I.

During Phase II the valves of block 60 are open and the valves of block 61 are closed, as indicated in FIG. 5b. During Phase II the air pressure from tube 55 is applied to vessel 21 through tube line 59, 57. The air pressure from tube 54 is applied through tube 65 to vessel 15. Then, during a first step (a) filtration occurs during flow of bacterial suspension from vessel 21 through tube line 53, 20a to filtering device 10. The valves of blocks 62 and 63 are open and concentrated bacterial suspension is discharged through tube 13a to vessel 15 as indicated by the double arrows. During a second step (b) valves 62 are open and valves 63 are closed while valve 64 of tube 22 for rinsing fluid is opened for regeneration of the filtering device, whereby the rinsing fluid is discharged to vessel 15. Then, a third step (c) is carried out when valve 64 for rinsing fluid is closed, and a flow of suspension starts from vessel 21 via filtering device 10 to vessel 15. Then, the filtration step (a) is restarted according to the previous description.

FIG. 5c shows how the embodiments according to FIGS. 5a and 5b can be connected to a source of pressurized air 66. Therefrom runs a tube 66' through a combined oil and sterile filter 66'' to the three tubes 54, 55 and 56 previously mentioned. In tube 56 to vessel 25 for rinsing fluid there is included a reducing valve 67' which may be adjusted to e.g. 45 psi. In tube 55 supplying propelling pressure there is a reducing valve 67'' adjusted to e.g. 17 psi, and in tube 54 which shall supply counter pressure there is a reducing valve 67''' the adjustment of which may be e.g. 7 psi.

From tube 54 after valve 67''' there is a branch tube 68 provided with a sterile filter 68' and a reducing valve 68''. It should be adjusted to a slightly higher pressure than the counter pressure, e.g. 7.5 psi. Tube 68 opens to the surrounding atmosphere and allows sterile air to be vented from one of vessels 15 and 21 for the equalization of pressures e.g. when changing between Phases I and II.

Figure 6:
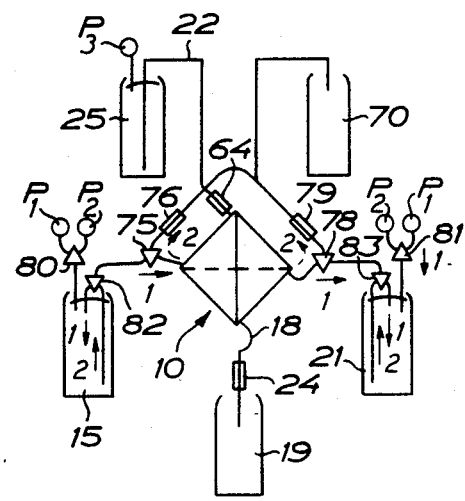
FIGS. 6-8 show three embodiments of a filtering device with connections and an additional vessel.
Figure 7:
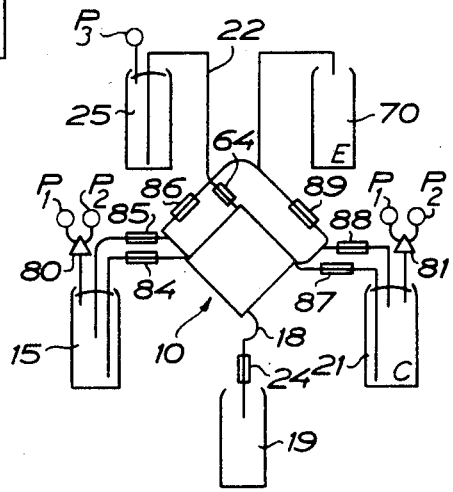
Figure 8:
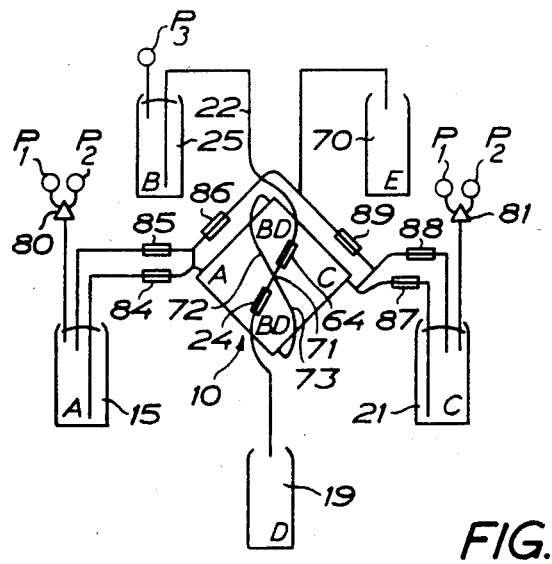

In FIGS. 6, 7 and 8 three separation systems are illustrated. Exactly like the ones already described they comprise two suspension vessels 15 and 21 and a filtering device 10 which is connected to a collecting vessel 19 for filtrate and to a vessel 25 for rinsing fluid. In all three systems, besides, there is one additional vessel 70, which may be open to the atmosphere but preferably is in the shape of a closable pressure vessel, which is provided with a sterile filter for air (not shown) and can be used in place of an empty suspension vessel 15 or 21. The reason why an additional vessel is included is the following. During each filtration step a gradually increasing film or coating of bacteria is observed on the primary membrane surfaces of the filtering device. When later during the rinsing step (b) the rinsing fluid is supplied, this film of bacteria is removed from the filter membrane, and according to the embodiments previously described it will be discharged, as a concentrated suspension in rinsing fluid, to one or the other suspension vessel 15 or 21. In the embodiments according to FIGS. 6 to 8 the tube connections and valves are so arranged that during rinsing the concentrated bacteria suspension is rinsing fluid will be discharged to the additional vessel 70 and not, as before, be mixed with concentrated bacteria suspension in growth medium, which is contained in one of the two suspension vessels 15 and 21. Thus, it is avoided that the amount of bacteria resuspended during rinsing unnecessarily interferes with continued filtration. It is also avoided that the fluid phase of the suspension in the receiving suspension vessel 15 or 21 is diluted with rinsing fluid, which might be particularly important if it is desired to purify a soluble microbial product.

The two embodiments according to FIGS. 6 and 7 differ in that the embodiment of FIG. 6 has a smaller number of tubes than that of FIG. 7 but more three-way valves, while the embodiment of FIG. 7, besides more tubes, is consequently equipped with two-way valves, except for the two three-way valves for pressurized air from two different pressure sources to suspension vessels 15 and 21. In the drawings two-way valves are diagrammatically indicated by rectangles and three-way valves with triangles. It is also apparent from a comparsion of FIGS. 6 and 7 that in the latter setup the number of valves to be passed by the suspension on its way from vessel 15 to the vessel 21 or to the additional vessel 70 has been reduced by one half. This might have some importance for flow resistance which might be reduced but on the other hand this requires a suitable, slightly more complicated control device.

The embodiments of FIGS. 7 and 8 have substantially the same valve system and flow arrangement. The only difference is seen in the following: according to FIG. 7 as well as according to previous embodiments the filtrate is discharged from the filtering device 10 through one opening only and rinsing fluid is supplied to the filtering device through one diagonally disposed opening. However, since both openings are connected to the secondary surface of each filter membrane and since valves 64 and 24 never are to be opened at the same time a potentially advantageous arrangement of tube lines can be embodied as indicated in FIG. 8 where in point 71 tubes 18, 22, 72 and 73 are interconnected, the latter two in turn communicating with the diagonally opposed openings of filtering device 10, which in previous embodiments were connected one directly with tube 18 and one directly with tube 22. With this arrangement, during a rinsing step (b) the rinsing fluid will be supplied through tube 22 and branch tubes 72 and 73 to the filtering device 10 to the effect that it later, as in previous embodiments, is discharged to either vessel 15 or vessel 21 or possibly to the additional vessel 70. During filtration valve 64 of tube 22 for rinsing fluid is closed while valve 24 of tube 18 for filtrate is open. Then filtrate will be discharged from the filtering device from the secondary surface of each membrane through tubes 72 and 73 to the branching point 71 and from there it will reach collecting vessel 19 through tube 18 for filtrate.

Each of the wet parts of the filtration equipment as described above is associated with a control device for (semi)automatic control of valves and flows. Such a device preferably contains a time relay, not shown, which controls e.g. the solenoids of the valves activated in the change between the working steps (a,b,c) of the process. The change between Phases I and II may take place manually or automatically, initiated e.g. by a level sensor registering the emptying of a vessel. The solenoids of the electromagnetic valves preferably are detachable from the tubing in order to allow autoclaving of the valves.

Figure 9:
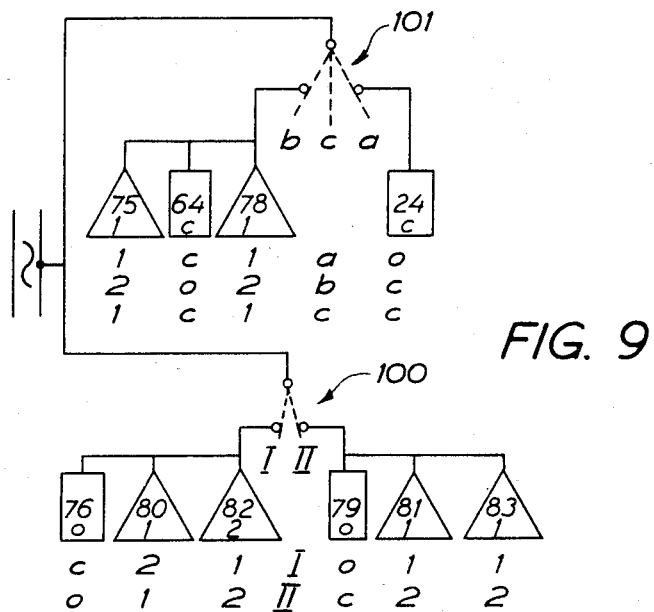
FIG. 9 is a wiring diagram of a valve control device for a filtration equipment according to FIG. 6.

The control of the valves during the operation of an equipment according to FIG. 6 will be understood from FIG. 9 and the following table:

TABLE 1

| Valves | 76 | 76 | 64 | 78 | 79 | 24 | 80 | 81 | 82 | 83 |
|---|---|---|---|---|---|---|---|---|---|---|
| Normal position | 1 | 0 | C | 1 | 0 | C | 1 | 1 | 2 | 1 |
| Phase I, step a | 1 | C | C | 1 | 0 | 0 | 2 | 1 | 1 | 1 |
| step b | 2 | C | 0 | 2 | 0 | C | 2 | 1 | 1 | 1 |
| step c | 1 | C | C | 1 | 0 | C | 2 | 1 | 1 | 1 |
| Phase II, step a | 1 | 0 | C | 1 | C | 0 | 1 | 2 | 2 | 2 |
| step b | 2 | 0 | 0 | 2 | C | C | 1 | 2 | 2 | 2 |
| step c | 1 | 0 | C | 1 | C | C | 1 | 2 | 2 | 2 |

FIG. 9 shows diagrammatically a non-limiting illustrative wiring diagram from the control of electromagnetic valves in an equipment according to FIG. 6. The diagram consists of a phase shifter 100 with two positions I and II corresponding to Phase I and Phase II, respectively, and a step shifter 101 with three positions a,b and c corresponding to steps (a), (b) and (c), respectively. Step shifter 101 may comprise a synchronous AC motor with cams and microswitches or may comprise one or several electronic time relays.

The positions of the valves in the absence of current have been indicated in FIG. 9 where C stands for closed and O for open position and where the symbols representing the valves are assigned the same references as in FIG. 6. The opposite positions are attained at the closing of each circuit. Thus, it is apparent that the phase shifter in position I activates valves 76, 80 and 82 to the positions indicated in FIG. 9 in the line marked I, while valves 79, 81 and 83 in this situation remain in their resting positions. When changing to Phase II there takes place a symmetric change of positions of these six valves, as indicated in the line marked II in FIG. 9. Irrespective of the position of the phase shifter, the step shifter 101 controls valves 24, 64, 75 and 78 as indicated in FIG. 9 and according to Table 1.

Figure 10:
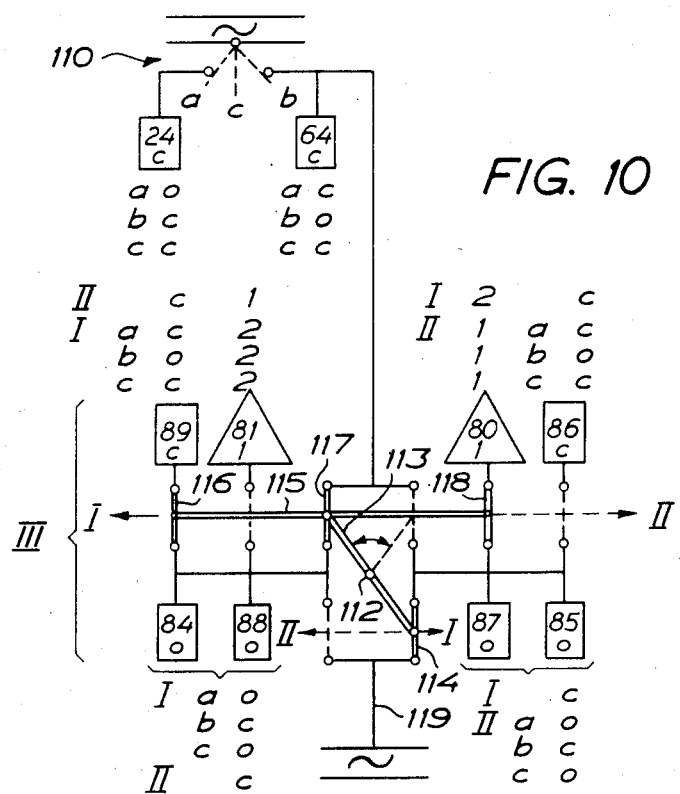
FIG. 10 is a wiring diagram for controlling the valves of an equipment according to FIG. 7 or 8.

The control of the valves of an equipment according to FIG. 7 or 8 will be understood from FIG. 10 and from the following table:

TABLE 2

| Valves | 84 | 85 | 86 | 64 | 87 | 88 | 89 | 24 | 80 | 81 |
|---|---|---|---|---|---|---|---|---|---|---|
| Normal position | 0 | 0 | C | C | 0 | 0 | C | C | 1 | 1 |
| Phase I, step a | 0 | C | C | C | C | 0 | C | 0 | 2 | 1 |
| step b | C | C | C | 0 | C | 0 | C | 2 | 1 |
| step c | 0 | C | C | C | C | 0 | C | C | 2 | 1 |
| Phase II, step a | C | 0 | C | C | 0 | C | C | 0 | 1 | 2 |
| step b | C | 0 | 0 | 0 | C | C | C | C | 1 | 2 |
| step c | C | 0 | C | C | 0 | C | C | C | 1 | 2 |

FIG. 10 discloses a wiring diagram for controlling the valves of an equipment according to FIG. 7 or 8, where three-way valves 80 and 81 are used only for the pressurized air to suspension vessels 15 and 21. Also in FIG. 10 these valves are indicated by triangles while two-way valves are indicated by rectangles. These are assigned the same references as the respective valves, and the position of the valve when deenergized is indicated by C for closed and O for open. For three-way valves 80, 81, numbers 1 and 2 stand for an open flow path to pressure source $p_1$ or $p_2$, respectively, in FIGS. 7 and 8.

By means of step shifter 110 it can be changed between steps (a), (b) and (c). In step (a) only valve 24 for filtrate is energized and thus opened. In step (c) there is no change except that valve 24 is closed. However, in step (b) different valves are energized depending on phase shifter 111 standing in position I or II. Phase shifter 111 comprises an arm 113 pivoted about an axis 112. The arm is linked on one hand to a contact bridge 114 and on the other hand by means of a mobile rod 115 to three contact bridges 116, 117, and 118. Arm 113 and rod 115 are made of electrically insulating material. The contact bridges thus may be adjusted to either of two positions, corresponding to Phases I and II, by means of arm 113.

In Phase I valves 80, 85 and 87 are constantly energized from a bus bar 119 through contact bridge 114 in phase shifter 111, while valves 81 and 86 are constantly deenergized and valves 84, 88 and 89 are intermittently energized by means of step shifter 110 and contact bridge 117 in phase shifter 111. When changing to Phase II there takes place a symmetric change-over of the control of the valves controlled by phase shifter 111 to the effect that valves 81, 84 and 88 are constantly energized from bus bar 119, while valves 80 and 89 are constantly deenergized and valves 85, 86 and 87 are intermittently energized by step shifter 110. As indicated in FIG. 10, the latter controls valves 24 and 64 in the same way irrespective of the position of phase shifter 111.

Figure 11:
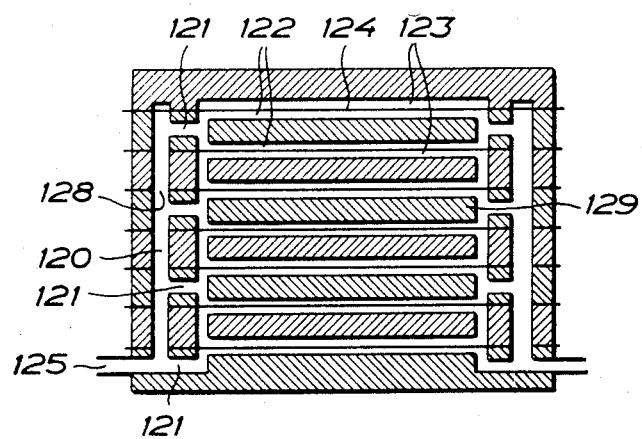
FIG. 11 is a vertical sectional view of a prior art filtering device with a number of filter membranes.

A known filtering device which can be loaded with several filter membranes having flow paths arranged in parallel is illustrated in FIG. 11 which is a vertical sectional view of the device through a flow passage at one of two identical, diagonally opposed corners. The holder is of an asymmetric construction in the way that each of the four vertical flow passages 120 within the filtering device along the length thereof discharges into and is supplied from branch passages 121 communicating with primary surfaces 122 of the filter membranes 124 or secondary surfaces 123 thereof.

As described above the known filtering device being square in a horizontal section, has two additional vertical corner flow passages rotated 90° in relation to the corner flow passages of FIG. 11 but otherwise positioned as these are. However, the branch passages from these additional corner flow passages not shown are located on those levels where there are no branch passages according to FIG. 11. This is obviously a simple arrangement for connecting diagonally opposite corner openings either by way of any of the primary surfaces only or by way of any of the secondary surfaces only, which is inherently characterized by a favourable minimal dead volume.

One can expect that the top filter membrane designated 124 in FIG. 11 which is supplied by the last branch passage 121 most remote from opening 125 of vertical flow passage 120 is subjected to lower propelling pressures and reduced flow rates than the bottom membrane 124, which is supplied by the first corresponding branch passage 121. This may explain why there is a tendency to greater coating of bacteria on the top membrane 124 than on the bottom membrane 124 also after thorough rinsing of the device after use. With this background one can envisage a filtering device with a more symmetrical supply of fluid, which is more suitable for the actual needs, as illustrated in FIG. 12.

Figure 12:
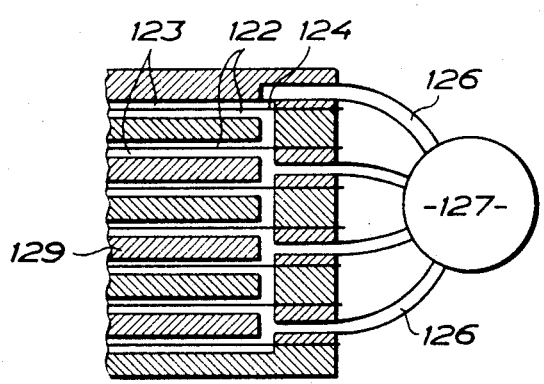
FIG. 12 is a corresponding view of a novel filtering device having a number of filter membranes.

According to the invention inlet flow tubes 126 are symmetrically interconnected in a distributing device 127 disposed outside the filter membrane holder proper as indicated in FIG. 12. This construction has an important favourable side effect in that the need for holes 128 (perforations) in filter membranes 124 for the vertical passages 120 is eliminated. The solution of the problem of uneven loading illustrated in FIG. 12 can be expected to optimize the two alternating steps of filtering and rinsing on one hand to the effect that the coating of the solid phase on the membranes during filtering will take place as symmetrically as possible, and on the other hand to the effect that the rinsing fluid hits the filter mdmbranes thus coated as symmetrically as possible. Particularly, one can expect that the rinsing steps can be made relatively shorter and require a smaller fluid volume which among other things provides the important advantage that the concentration can be finished more rapidly.

In the known device according to FIG. 11 and in the novel device according to FIG. 12 there are used in the filter membrane holder "fill up" bodies 129 made of metal, plastics or other material in order to support the filtering membranes efficiently and to form narrow flow paths providing an optimally reduced dead volume.

As mentioned above an apparatus according to the invention—substantially according to FIGS. 5a and 5b—has been used for the concentration and washing of bacteria, inter alia staphylococci grown to maximum density in a rich fluid medium termed CCY broth. During the initial concentration procedure comprising a small number of Phases I and II the virtually bacteria-free filtrate corresponding to 85 to 90% of the broth volume was collected for the purification of a certain protein produced by most strains of *Staphylococcus Aureus*, termed protein A. Typically the filtration process runs with filtration steps (a) of 15 to 90 seconds, preferably 30 to 90 seconds, the shortest periods applying when the suspension to be filtered is close to maximum concentration, while the intervening rinsing steps (b) are held shorter than 5 seconds and the starting steps (c) are held shorter than 2 seconds. In an alternating fashion rinsing fluid was added to the concentrated bacterial suspension and thus diluted suspension was again concentrated to the effect that the optical density (color intensity) of the suspension medium of the final concentrated bacterial suspension was reduced to less than 1/20 of the optical density of the initially collected filtrate. With the intent to produce a reagent of staphylococci (of strain Cowan I of *Staphylococcus Aureus*) with an important capacity to bind immunoglobulin because of a non-immune affinity between immunoglobulin and protein A present in the cell wall of the staphylococci (S. Jonsson and G. Kronvall, Europ. J. Immunol. Vol 4, page 29, 1974) there was added in a subsequent step a 10% water solution of formaldehyde to a final concentration of 1% (weight per volume). After 1½ hour's slow mixing the excess of formaldehyde was washed away by means of the filtration method according to the invention. Then, the bacteria were heat-killed according to the priciple of pasteurization, whereby inter alia a yellow pigment and protein A were dissolved from the bacteria.

Therefore, the bacteria were as a final measure now processed according to the invention again. However, in the meantime the filtering device had been chemically disinfected or sterilized, such as heat sterilized by autoclaving, which is possible with the described device. The work involved in the manual processing of 10 liters of cultured broth according to the invention amounts to less than two thirds of the work when doing the same job by means of a conventional centrifuge having a large rotor with 2 liters capacity.

The application of the present invention provides a number of advantages. Among these should be mentioned that there can be obtained a flow rate of 0.6 to 1.2 liters bacterial suspension per minute (depending on concentration) of which 60 to 75% can be collected as a sterile filtrate in one passage at the same time as a 4 to 5 fold concentration of the bacterial suspension is achieved. It is possible to produce a washed bacterial suspension of a concentration of at least 10% (volume per volume) and also to wash it after treatment e.g. with formaldehyde.

A most important advantage has become obvious in the preparation of reagent staphylococci as described above starting with a bacterial broth cultivated in a so-called fermentor with optimized growth conditions for bacteria, inter alia through the rapid supply of pressurized air for maximal oxygenization. This requires the addition of an anti-foam surfactant substance e.g. polyethylene glycol, but results in a 5 to 10 fold higher yield. When using centrifuges for the production of reagent staphylococci from such high yield broth cultures according to the published procedure (S. Jonsson and G. Kronvall, Europ. J. Immunol. Vol. 4, page 29, 1974) involving treatment with formaldehyde and heat, the formaldehyde treated bacteria from a sediment that is virtually impossible to resuspend to a homogenous suspension that will not sediment immediately. However, when applying the present invention for the same work at every one of 25 trials there were obtained a perfect suspension of reagent staphylococci.

The invention also provides satisfying possibilities to avoid the formation of aerosol and other contamination of the environment with pathogene microbes. It is also possible to produce a bacteria-free filtrate of the cultured broth. Both aspects are of potentially great importance for the production of vaccines.

The equipment can be produced at a net cost of about 1/5 to ⅓ of that of a semi-continously operating centrifuge having a capacity of 50 to 75% of that of an equipment according to FIGS. 5a and 5b.

The reported results have been achieved with starting volumes of 10 to 250 liters. Evidently, the filter membranes for the process can be reused at repeated occasions without any tendency to definite obstruction or other problems. The method according to the invention appears to be surprisingly favourable particularly for work with pathogene bacteria but also as far as capacity and costs are concerned.

It will be apparent to those skilled in the art that various other modifications and variations in addition to those mentioned above could be made in the method and apparatus of the invention without departing from the scope and spirit of the invention.

I claim:

1. An integrated method for concentrating and harvesting bacteria from a liquid substrate by filtering a suspension containing bacteria through a filtering device including a filter membrane having a primary side and a secondary side and for backwashing said membrane wherein the suspension during recurrent periods is supplied to the filtering device through a first passage in tangential flow during filtration along substantially the entire primary side of the filter membrane, concentrated bacteria are removed through a second passage on the same side of said filter as said first passage during filtration, liquid substrate is recovered through a third passage on the secondary side of said filter, and wherein a separate rinsing fluid is supplied to the filtering device through a fourth passage for backwashing the filter membrane from the secondary side through the filter membrane to the primary side during short intermissions between said periods in a continuous process and is discharged through said second passage for resuspending bacteria from the filter membrane and backwashing said resuspended bacteria into the suspension of concentrated bacteria, said first and third passages being closed during said intermissions.

2. The method of claim 1 including the steps of automatically successively and recurrently suspending the supplying of the suspension containing bacteria along the primary side of the filter membrane, supplying the rinsing fluid to the secondary side of the filter membrane, suspending the supplying of the rinsing fluid, and re-supplying the suspension along the primary side of the filter membrane.

3. A method as claimed in claim 2 wherein the suspension during a filtration period is propelled into the filtering device by means of a pressure.

4. A method as claimed in claim 2 wherein a counter pressure is applied on the suspension leaving the filtering device through said second passage, by applying pressure on the suspension in a collecting vessel communicating with said second passage.

5. A method as claimed in claim 2 wherein the rinsing fluid is supplied under pressure to the filtering device.

6. A method as claimed in claim 2 wherein the filtrate discharged through said third passage is under controlled pressure.

7. A method as claimed in claim 2 wherein a filtration period is started by a step during which said third passage initially is kept closed until tangential flow of suspension is initiated in the desired direction, said third passage then being opened for normal filtration.

8. A method as claimed in claim 2 wherein bacteria concentrate of solid phase resuspended in rinsing fluid discharged from the filtering device is supplied to an additional vessel for collection.

9. A method as claimed in claim 8 wherein the flow paths after the major part of the suspension has been collected in said additional vessel, are switched to the effect that said additional vessel changes position with one of the other vessels which at the time is emptied, for further washing of the solid phase.

10. A method as claimed in claim 2 wherein filtration is carried through by conveying the suspension from one suspension vessel to another suspension vessel in one direction across the primary side of said filter and also by conveying the suspension across the primary side of the filter in the opposite direction.

11. A method as claimed in claim 2 wherein the suspension, during filtration, is supplied to the filtering device from alternative suspension vessels and filtrate is discharged from the filtering device through at least two symmetrically positioned passages communicating with a vessel for filtrate.

12. A method as claimed in claim 2 wherein rinsing fluid, during rinsing, is supplied to the filtering device through more than one passage while filter membrane coating resuspended in rinsing fluid is supplied to alternative suspension vessels.

13. A method as claimed in claim 2 wherein the suspension is conveyed through several filter membranes connected in parallel.

14. A method as claimed in claims 12 or 13 wherein during filtration suspension is supplied to and discharged from the filtering device through a pair of opposite passages, wherein filtrate is discharged from the filtering device through a second pair of opposite passages and wherein during rinsing said rinsing fluid is supplied through said second pair of opposite passages.

15. A method as claimed in claim 2 wherein the suspension in a suspension vessel, after being maximally concentrated, is diluted.

* * * * *